UNITED STATES PATENT OFFICE.

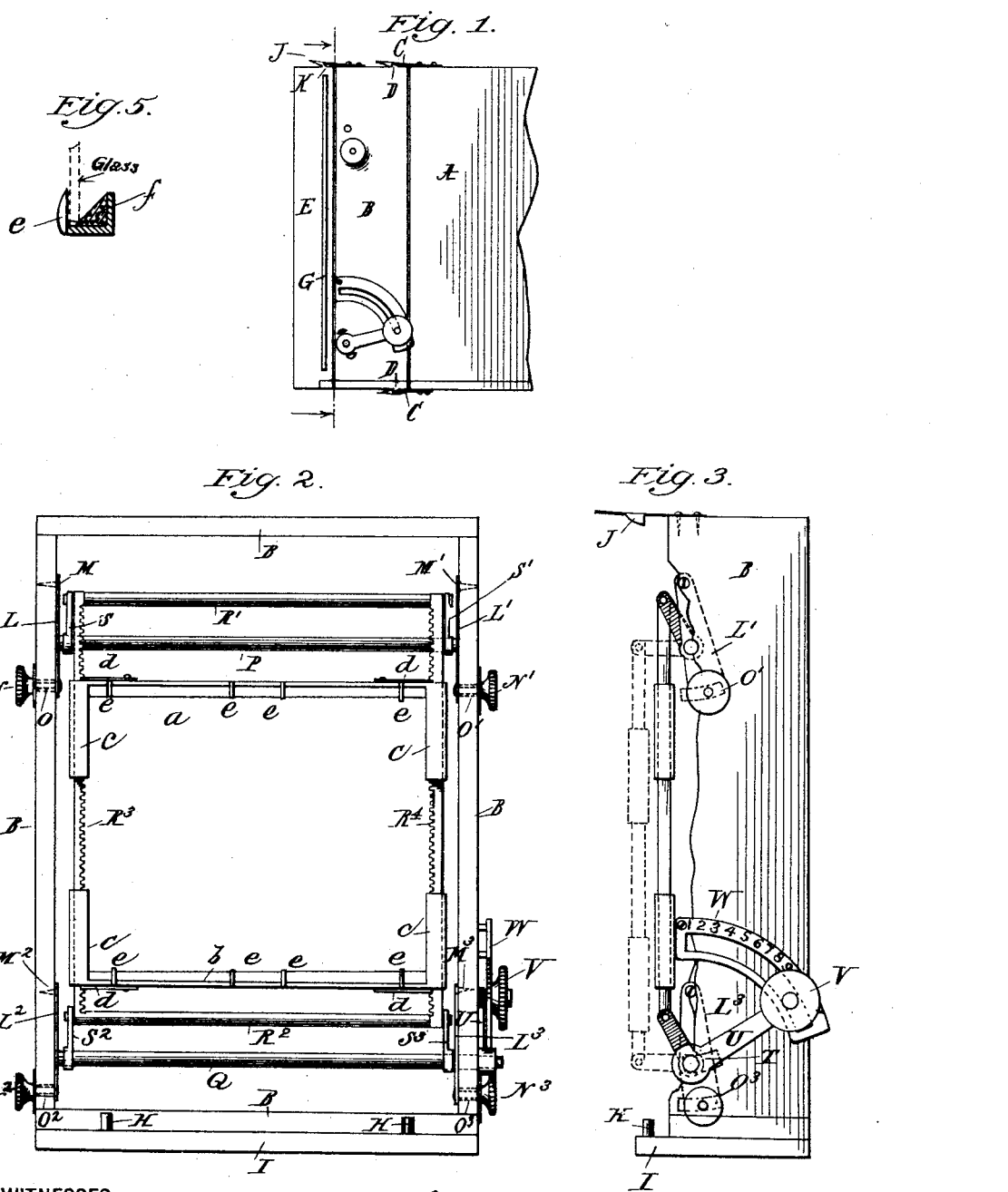

ERASTUS B. BARKER, OF NEWARK, NEW JERSEY, ASSIGNOR TO THE E. & H. T. ANTHONY & COMPANY, OF NEW YORK, N. Y.

PHOTOGRAPHIC CAMERA.

SPECIFICATION forming part of Letters Patent No. 537,797, dated April 16, 1895.

Application filed January 5, 1895. Serial No. 533,900. (No model.)

*To all whom it may concern:*

Be it known that I, ERASTUS B. BARKER, a citizen of the United States, and a resident of Newark, in the county of Essex and State of New Jersey, have invented certain new and useful Improvements in Photographic Cameras, of which the following is a specification.

My invention relates to improvements in the apparatus by which pictures or negatives of the "half-tone process" so-called, are made, wherein a plate, with etched or engraved lines, called the "lined plate," or by some, the "interference plate" is interposed between the lens and the sensitive plate.

Plate holders have heretofore been made that embody as an integral part of their construction, the said lined screen, but when so made, the screen forming part of the plate holder necessitates the transportation of the screen wherever and whenever the plate holder itself is transported or moved, for instance, to and from the dark room, for every exposure. Consequently, the lined screens, which are relatively very expensive, are continually subjected to liability of fracture, either through carelessness or accident, and this liability is increased by the fact that the presence of the screen in the plate holder makes it much heavier, more bulky and consequently more awkward to handle than the ordinary plate holders, which photographers are most accustomed to manipulate.

By my invention the lined screen is detachably attached to the camera, and when in use forms an integral and permanent part of it; yet is provided with means whereby it may be instantly detached when it is desired to use the camera without the screen, and my improvement also embodies devices whereby the lined screen may be exactly adjusted to the sensitive plate behind it, thus compensating for defects, if any, in the holder for the sensitive plate, such as warping or twisting, and also I provide means whereby the lined screen may be instantly located nearer to or farther from the sensitive plate, thus enabling the photographer to quickly and easily adapt his camera to produce pictures or negatives having differing degrees of fineness or boldness, and I also provide a suitable index, whereby any desired proximity of the lined screen to the sensitive plate may be obtained with exactness and without calculation or measurement. These last three features are new, so far as I am aware, in any form of apparatus designed for this work.

In the drawings hereof:—Figure 1 illustrates an edgewise elevation of the attachment, reduced from ordinary, actual size. Fig. 2 illustrates an elevation of the attachment, as seen from the rear, the plate holder being removed. Fig. 3 illustrates an edgewise view partly broken away, of the frame and the devices, which support and actuate the lined screen. Fig. 4 illustrates a detail. Fig. 5 illustrates a detail of the sliding supports for the lined screen, shown in section.

Referring to Fig. 1—A represents the rear end of the camera box. It may be of any preferred construction. B is one edge of the frame or box, which supports the lined screen. It is detachably attached to the rear end of the camera box A, in any preferred manner. I show the well known spring clips C, C, (Fig. 1,) which snap over and hold against hooks or lugs D, D. E is the plate holder, which contains the sensitive plate. G is the slide thereof. This plate holder is detachably attached to the rear end of the frame B, in any preferred manner. I illustrate dowels H (see Fig. 3) on a ledge I, at the bottom of the frame B, which fit into holes in the bottom piece of the plate holder, in conjunction with a clip J and lug K, as such means.

Referring now to Figs. 2 and 3; L, L', $L^2$ and $L^3$ are swinging journals. They are each pivoted at M, M', $M^2$ and $M^3$ respectively to the sides of the frame B, and at their lower or swinging end; they are each provided with a set screw N, N', $N^2$ and $N^3$, respectively, the shanks of which play through curved slots O, O', $O^2$ and $O^3$ respectively, made in the sides of the frame B. P and Q are two cross shafts, which are journaled respectively in the swinging journals L, L', $L^2$, $L^3$, as shown. Two horizontal bars or rods, R' and $R^2$ and two vertical toothed bars $R^3$ and $R^4$, which resemble rock bars, constitute a rectangular frame. This frame is a rigid one, and is connected to the shafts P and Q by parallel and equal length links, S, S' and $S^2$, and $S^3$, respectively. These links are fixed on the shafts P and Q, but are pivoted to the rods R' and R², as shown. The lower shaft Q projects at one end through a curved slot T made in the side of the frame B, and has a crank lever U, fixed on its end, which is provided with a set screw V, on its end, which engages with, and locks the lever at any desired point on the index W. This index is provided with numerals 1, 2, 3, &c., as shown, or any suitable indices, which designate tenths of inches or other distance of the lined screen from the sensitive plate. $a$ and $b$ are two sliding supports for the lined screen. They are each provided on their ends with sleeves $c$, which slide on the vertical racks or toothed bars R³, R⁴, and at each end, also latches $d$ are provided, which are pivoted at one end to the supports $a$ and $b$, and at their swinging ends, engage with such of the teeth of the bars R³, R⁴, as may be appropriate to give to the said supports $a$ and $b$, the desired vertical position.

$e, e$ (see Figs. 2 and 5) are hooks, preferably made of silver, so that no injury will result should they come in contact with the emulsion on the sensitive plate. I also make the front edges of these silver hooks curved vertically (see Fig. 5) and taper them sidewise so that their front edges are relatively thin. By this construction, the points of contact between the hooks and the sensitive emulsion are of small area. I also preferably make the supporting bars of angular form, as shown in Fig. 5, and fasten a three cornered piece of wood $f$ in the angle of the support, the inclined face of which is presented forwardly, so that the lined screen will, when introduced automatically assume a position in close contact with the hooks both on the upper and lower support. The details of this construction are not important. I describe them merely because they are efficient and simple.

The operation of the apparatus is as follows: the parts being in position, the ground glass is placed ready for focussing. The lever U is then moved sufficiently to allow the lined screen to come as close to the ground glass as desired, and the position is noted on the index, or the desired position may be predetermined by the graduations on the index. The lined screen is then returned to its first position, the ground glass removed, and replaced by the holder containing the sensitive plate. The dark slide being now removed, the lined screen is swung by the lever U to the inside of the holder into the desired plane. The exposure is now made. The lined screen is then returned to normal position, the dark slide replaced, and the plate holder disconnected and taken to the dark room, leaving the lined screen safe and protected against injury, on the camera. If, for any reason, as for instance, the warping or twisting of the plate holder or irregularities in the sensitive surface, or its position in the plate holder, adjustments are necessary or desirable, they can be immediately and easily obtained by swinging the pivoted journal plates, L, L', L², L³, one or more of them, forwardly or rearwardly, as may be needful, whereby the position of the screen will be correspondingly varied.

I do not limit myself to the details of construction shown or described, excepting as hereinafter specifically claimed, because they may be varied and still the essentials of my invention be employed.

I claim—

1. A frame separate and distinct from the plate holder, adapted to contain a lined screen and having means whereby it may be detachably attached to the camera, and other means whereby the plate holder may be attached to it, for the purposes set forth.

2. A frame separate and distinct from the plate holder, adapted to contain a lined screen, having means whereby it may be detachably attached to the camera, and other means substantially as shown whereby the screen may be moved into any desired position within the said screen holding frame, for the purposes set forth.

3. An outer frame provided with means whereby it may be attached to a camera and having also other means whereby a plate-holder may be attached to it, a frame for the support of the lined screen attached to said outer frame, and means accessible from the exterior of the outer frame, whereby the screen supporting frame may move longitudinally toward and from the sensitive plate, for the purposes set forth.

4. The combination of an outer frame, provided with means whereby it may be detachably attached to a camera, and also with other means whereby the plate-holder may be attached to it, a frame for the support of the lined screen, attached to said outer frame and longitudinally movable within the same, supports for the screen vertically adjustable within said longitudinally movable frame, and means accessible from the exterior of the first named frame for longitudinally moving said lined screen frame, for the purposes set forth.

5. The combination of an outer frame, an inner movable frame, for the support of the lined screen, a shaft with which said movable frame is connected, and by which it is moved, a crank on the said shaft, outside of the first named frame, and an index, visible from the exterior thereof, with which said crank engages, for the purposes set forth.

6. The combination of an outer frame, pivoted journal plates supported on said frame, cross shafts, journaled in said pivoted plates, a frame for the support of a lined screen, links connecting said frame with said shafts, a lever connected with one of said shafts on the exterior of the first named frame, and means to confine the said lever, for the purposes set forth.

7. A frame for the support of a lined screen comprising an exterior frame, adapted to be connected with a camera, pivoted journal plates, supported on said frame, means to clamp said plates in position, cross shafts, journaled in said plates, a frame for the support of the screen, connected with said shafts by links, bars vertically adjustable within said last named frame, a lever attached to one of said shafts, outside of the outer frame, an index with which said lever connects, and indices on said index, for the purposes set forth.

Signed at New York, in the county of New York and State of New York, this 4th day of January, A. D. 1895.

ERASTUS B. BARKER.

Witnesses:
J. H. HEATH,
W. B. MUSSEN.